3,186,696
HEATING UNIT
Kornelius Hildebrand, Washington Hotel,
Watertown, Wis.
Filed Nov. 14, 1962, Ser. No. 237,570
Claims priority, application Canada, Dec. 18, 1961,
838,285
17 Claims. (Cl. 263—11)

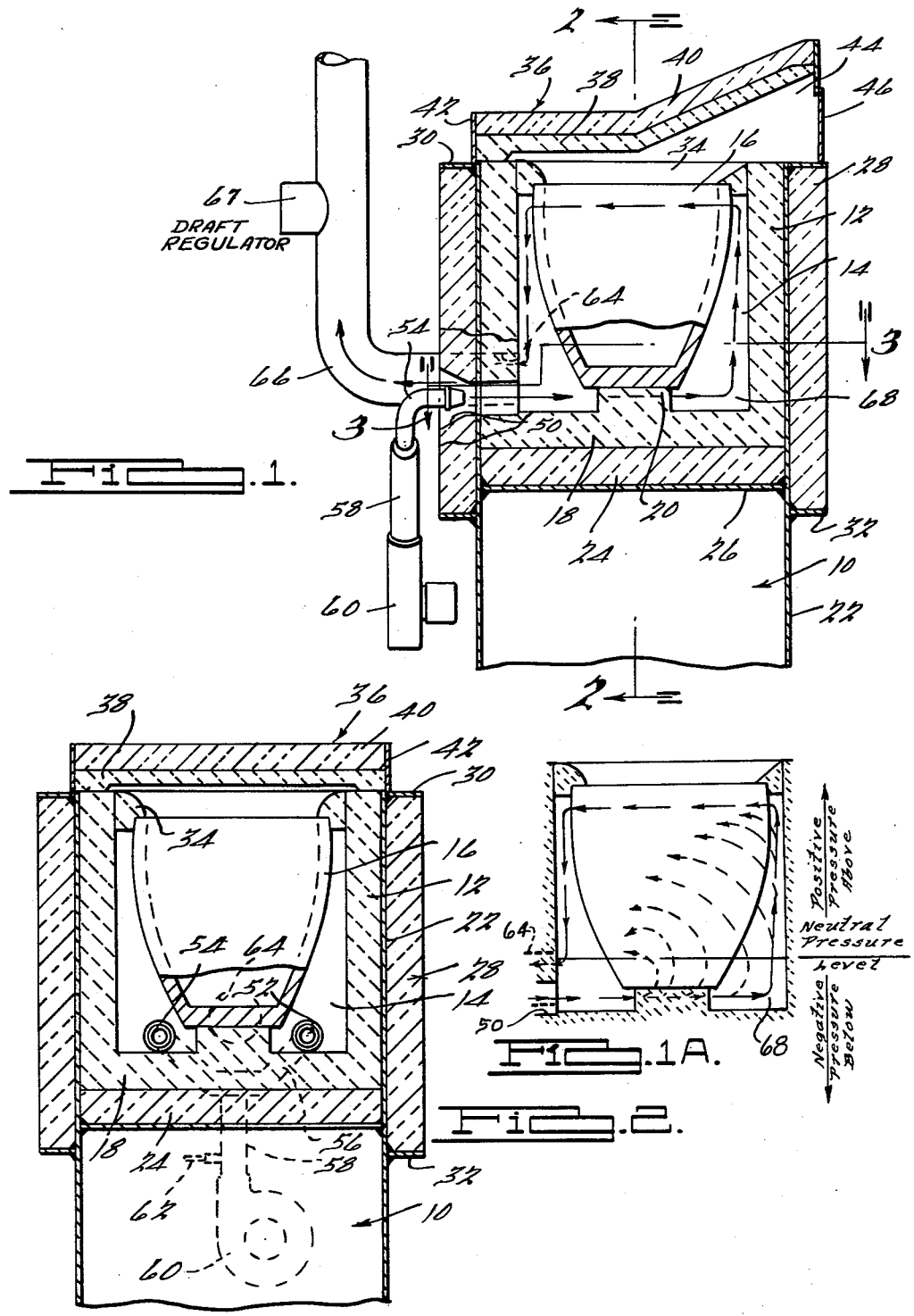

The present invention relates generally to heating units utilizing downdraft principles and for exemplary purposes is embodied herein in gas or oil fired furnaces for melting and/or holding molten, in crucibles or the like, metals or other materials.

It is a primary object of the present invention to provide a heating unit of this type which is so constructed that the heat current from the heating flames travel the longest possible path at the slowest possible speed around the object to be heated, usually a crucible or the like, whereby a maximum of the B.t.u.'s released by the flame will be absorbed from the hot combustion products by the object to be heated, thus maximizing efficiency and operating economy. A related object concerns the provision of such a heating unit which is of relatively inexpensive construction and wherein container life and refractory life are materially increased over that possible with presently available heating units by providing for the even absorption of heat over the entire surface area of the container to be heated through the elimination of hot spots, whereby further substantial economies are effected by reason of the need for fewer replacement containers and less refractory material in a given time, the elimination of frequent labor costs for replacement, and the reduction of costly downtime of both the heating unit and associated machines, which rely on it for heated material.

Another object resides in the provision of a heating unit of the above type in which an extremely even and efficient heat distribution is obtained, for maximum efficiency, without utilizing a large capacity blower for forcing a flow of hot combustion products, whereby there is eliminated the attendant objectionable noise, large power consumption, and wasted heat.

Yet a further object concerns the provision of a concept of heating which is applicable to heating units for heating either flowing or static fluids including furnaces for heating residences or the like, to baking or other ovens, and so on.

These and other objects of the present invention will become apparent from consideration of the specification taken in conjunction with tthe accompanying drawings in which there are illustrated several embodiments of the present invention, and wherein:

FIG. 1 is a longitudinal sectional view of a crucible or pot-type furnace embodying the principles of the present invention;

FIG. 1a is a similar view illustrating diagrammatically the pressure and flow distribution within the furnace;

FIG. 2 is a transverse sectional view taken along line 2—2 of FIG. 1;

Generally speaking, the furnace of the present invention comprises means defining a combustion chamber fully enclosing the outside surface of a crucible or the like, a pair of flame ports extending into the combustion chamber at one end thereof adjacent the bottom of the crucible, the burner ports lying in substantially the same horizontal plane, a burner nozzle disposed in each of the flame ports for directing a flame horizontally across the chamber, a pressure relief port extending from the combustion chamber at said one end, the pressure relief port being positioned adjacent the burner ports, and a stack communicating with the pressure relief port for drawing combustion products downward from the top of the chamber, the arrangement being such that when the burners are operating the hot combustion products therefrom will travel under the neutral pressure level substantially horizontally across the combustion chamber in separate streams along the lower portion of each side of the crucible until they meet one another at the opposite end of the chamber, whereupon the still separate streams will rise and flow above the neutral pressure level in the reverse direction substantially horizontally across the top of the combustion chamber around the sides of the crucible until they again meet at said one end of the chamber, at which time they will be drawn to the pressure relief port and be discharged through the stack. Below the neutral pressure level the movement is substantially in; above the line it is substantially up; reverse, down and out. The position of the neutral level at any one time is governed by the size of the opening required to pass the spent outgoing gases throughg the pressure relief port, i.e., the greater the volume of the entering gas-air mixture the lower the level for a given size port and a given stack, and so on. As will be more apparent hereinafter, the principles of the present invention may be embodied in many different forms, such as in furnaces utilizing more than two burners, and in furnaces and ovens in which an object other than a crucible is to be heated.

Figure 3:
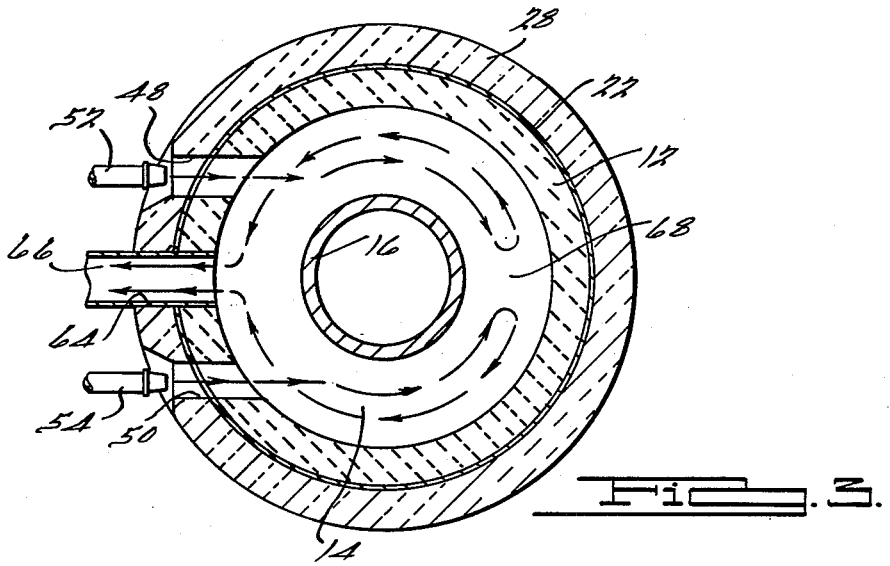
FIG. 3 is a horizontal sectional view taken along line 3—3 in FIG. 1.

Referring more particularly to the drawings, a first embodiment of the invention is illustrated in FIGS. 1 through 3. This embodiment comprises a base portion generally indicated at 10 for supporting a furnace including a generally cylindrical wall 12 formed of suitable refractory material and defining a generally annular combustion chamber 14 about a crucible 16 positioned therein. The lower extreme of combustion chamber 14 is defined by a bottom 18 formed of the same refractory material as wall 12 and provided centrally thereon with a projection 20 for supporting crucible 16. As can be seen, base 10 is simply the lower portion of a metal cylinder 22 which extends upwardly and surrounds wall 12 to thereby reinforce the latter. Beneath bottom 18 is provided a layer of insulating material 24, such as J-M Thermobestos or the like, and below it is provided a metal partition 26 secured to cylinder 22 for supporting the furnace structure. The outside of the furnace is insulated by an annular layer of insulating material 28, which also may be of J-M Thermobestos or the like, secured to the outside of cylinder 22 and maintained in place by a pair of annular flanges 30 and 32 secured to cylinder 22. Crucible 16 is sealed within combustion chamber 14 by means of an annular seal 34 of suitable refractory material, seal 34 also serving to define the upper end of combustion chamber 14 to fully enclose the latter.

At the top of the furnace there is provided a conventional cover 36 comprising a layer 38 of refractory material and a layer 40 of insulating material, and surrounded by a suitable metal band 42. To facilitate removal of molten materials from crucible 16 cover 38 is inclined upwardly at one end to define an access passageway 44. Access to passageway 44 from outside the furnace is controlled by means of a suitable door 46 which is mounted in a conventional manner for either pivotal or sliding movement into and out of the closed position shown in FIG. 1. Cover 38 may be hinged or pivoted to the top of the furnace in a usual manner, using a counterbalanced arrangement if desired, to facilitate access to the entire furnace for charging, pot replacement, and so on.

At one end of the combustion chamber, namely to the left as seen in FIGS. 1 and 3, and as close to the lower surface of the combustion chamber as possible, there are provided a pair of spaced longitudinally parallel flame ports 48 and 50 lying in a common horizontal plane. As best seen in FIG. 2, chamber 14 is substantially symmetrical about a central vertical plane perpendicular to the plane of that figure, and ports 48 and 50 are positioned symmetrically with respect to that plane. Coaxially positioned within flame ports 48 and 50 are burner nozzles 52 and 54, respectively, which communicate through a Y-connector 56 with an inlet tube 58. Air is supplied to inlet tube 58 by means of a suitable blower 60 at the lower end thereof, and fuel, in this case gas, is supplied thereto by means of a gas line 62 communicating therewith. Preferably the flame ports and burners are positioned both as closely to the bottom of the combustion chamber as possible and also spaced apart a distance such that they just straddle the bottom of crucible 16. In other words, the flame from each burner should not impinge directly on the crucible but should extend adjacent the lowermost side edges thereof so that when the hot combustion products rise they will, for the most part, traverse the side surfaces of the crucible. It is also preferable that the bottom of the crucible be positioned slightly above the plane of the burners so that a maximum amount of crucible area will be heated. The preferable relative positions of the crucible, bottom, burners and combustion chamber lower surfaces are shown in FIG. 2. It can be seen therein that the distance between the bottom of the container and the bottom of the chamber is less than the diameter of the flame ports.

Positioned intermediate flame ports 50 and 48 on a vertical line perpendicular to the plane of these ports is pressure relief port 64 which is connected to a stack 66 having a conventional draft regulator 67 therein. The distance of the pressure relief port from the bottom of the combustion chamber depends on the size of the apparatus and may be located from a position between the burners to a position directly above the burners.

The area in the combustion chamber above the neutral pressure level (see FIG. 1a) is known as the positive pressure area and the one below the neutral pressure level as the negative pressure area. Since the flames can enter the furnace and sweep to their farther reaches only in the negative pressure area below the neutral pressure level, this level should be positioned, for maximum gas-air mixture input, in a plane no lower than the level of the top of the flame ports. The essential consideration is that combustion products rise along one portion of the surface of the crucible and are drawn downward past a substantial amount of the remaining portion of the surface of the crucible before being drawn into the stack. This is the concept of downdraft combustion this invention is directed to and the vertical distance between the centers of the flame ports and the center of the pressure relief port will, in any given proposed furnace or oven, be governed by the size of the combustion chamber and crucible to be mounted therein.

The manner in which an even distribution of hot combustion products about the outer surface of crucible 16 is achieved will now be explained. As best seen in FIGS. 1, 1a, and 3, the flames enter combustion chamber 14 at one end thereof adjacent the bottom thereof. These flames and the separate streams of combustion products or heat currents resulting therefrom flow past and around the opposite lower sides of crucible 16 until they meet in a zone indicated at 68 at the opposite end of the chamber, as shown in dotted lines. In the course of travel to zone 68 there is a certain amount of heat raising due to convection and the low flow rate, as seen in FIG. 1a, however, the primary flow continues in a diminishing volume to zone 68 where the two heat streams from burners 52 and 54 meet and rise without mixing to a substantial degree and return each on its own side around the crucible until they again meet at the first-mentioned end of the combustion chamber, namely the left-hand end as seen in FIGS. 1 and 3. At this point they then descend under the combined influence of the deflecting action of wall 12 and one stream upon the other and the differential low pressure area created in the combustion chamber adjacent the pressure relief port by the stack effect, by which is meant the rise of hot combustion products through stack 66 which tends to draw the hot combustion products down from the upper end of the chamber past the surface of the crucible and out through the pressure relief port. As will be realized, actual flow is usually not as pure as that described, however, the principal flow pattern is the same and is such that the entire outer surface of the crucible is evenly heated. To obtain maximum absorption by the crucible of the B.t.u.'s released it is imperative that the heat flow path be as long as possible, the rate of flow as low as possible and the absorption area as large as possible. It has been found that this may be achieved by initially adjusting the fuel and air flow rates upwardly from a zero flow rate condition to a point where the momentum of the mixture is just sufficient to carry it into the combustion chamber along the beginning of the path indicated without being drawn up the stack through the pressure relief port. Standard fuel-air ratios may be used. When the proper flow rate exists each flame itself is generally so small as to seem of impossibly diminutive proportions, yet the amount of heating in such small flames is amazing due to the high efficiency which exists.

As will be appreciated, the distribution of heat in furnaces of the present invention results in tremendous economies. For example, in a pot type furnace constructed similar to the first embodiment it has been discovered and established that 100 lbs. of molten aluminum may be held molten in a crucible using only 30,000 B.t.u.'s per hour of natural gas. This figure compares with the American Gas Association representative average figures of 60,000 to 84,000 B.t.u.'s per hour to hold 100 lbs. of aluminum in a molten state. Applicant's furnace thus uses less than one-half the amount of fuel required by the average furnace. In plants where a large number of holding furnaces are used, the economies which may be realized by utilization of the present invention are tremendous. In the furnace tested two 1" close flame Sticktite burners, spaced 12" apart, were utilized, the furnace was of the standard size and shape for a 100 lb. aluminum crucible, the flame ports were of standard size to allow for the entrance of secondary air, and the flue was constructed according to industry standards for furnaces of this type. Combustion was found to be complete, with no trace of carbon monoxide. Additional economies reside in the increased pot life obtained with the present furnace. This is primarily due to the even heat distribution and the fact that the burners are so located that the flame therefrom does not directly impinge upon the crucible or pot, so that the latter is not subject to local deterioration as it would be in most presently used furnaces wherein flames would directly impinge upon it, thus substantially reducing its useful life and increasing labor replacement costs, new pot costs, and downtime of associated machines. Refractory life is also increased because of the even heat distribution.

Figure 4:
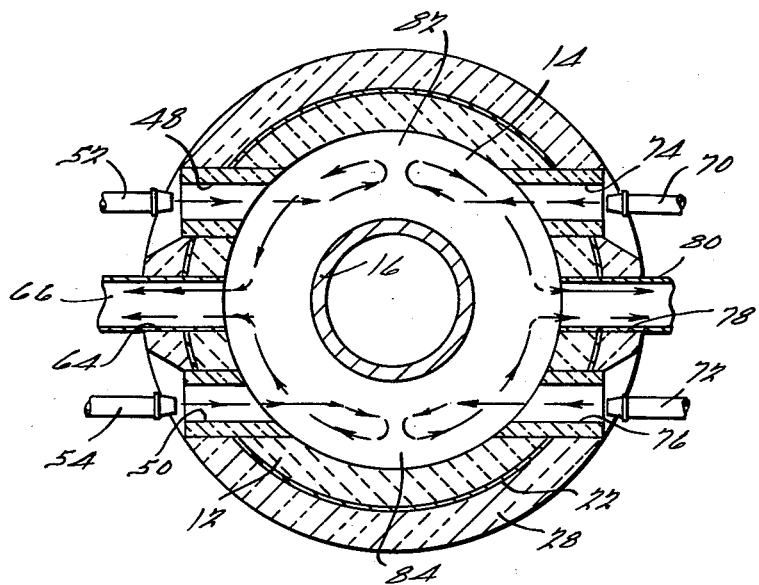
FIG. 4 is a similar figure illustrating a second embodiment of the present invention.

A second embodiment of the invention is illustrated in FIG. 4, in which similar parts are indicated by the same reference numeral as in the aforementioned embodiment. This embodiment differs from the first embodiment in the provision of a second pair of burners 70 and 72 operating through similar flame ports 74 and 76, respectively, in the opposite end of combustion chamber 14. Spaced intermediate and slightly above flame ports 74 and 76 is a similar pressure relief port 78 communicating with a stack 80. As can be seen, the flame ports, burners and pressure relief port are in axial alignment with their corresponding ports and burners on the opposite side of the combustion chamber. Whereas the first embodiment of the two-burner construction might be utilized as a holding furnace, this embodiment, with its four burners, might be used in applications where more heat is desired, such as where melting is desired, and/or where a higher melting point material is being heated and/or where larger quantities are being heated. The flow distribution principle, however, is substantially the same in both embodiments, and the same principles and considerations apply. In the second embodiment the only difference is that the flames and combustion products from burners 52 and 54 meet the flames and combustion products from burners 70 and 72, respectively, rather than each other. Therefore, there are two zones 82 and 84 where hot combustion products meet and then rise, rather than one, these two zones being located substantially along a vertical plane intermediate and parallel to the ends of the two pairs of burners. After the combustion products rise and flow back across the combustion chamber around the crucible towards the end of the chamber in which are located the burners from which they issued, they descend and are drawn out through the pressure relief ports. As will be appreciated, the principles of operation are exactly the same as in the preceding embodiment, and the flow rates are initially adjusted in the same manner. This particular embodiment lends itself well to applications utilizing a pot or crucible which is elongated along the plane of symmetry.

Figure 5:
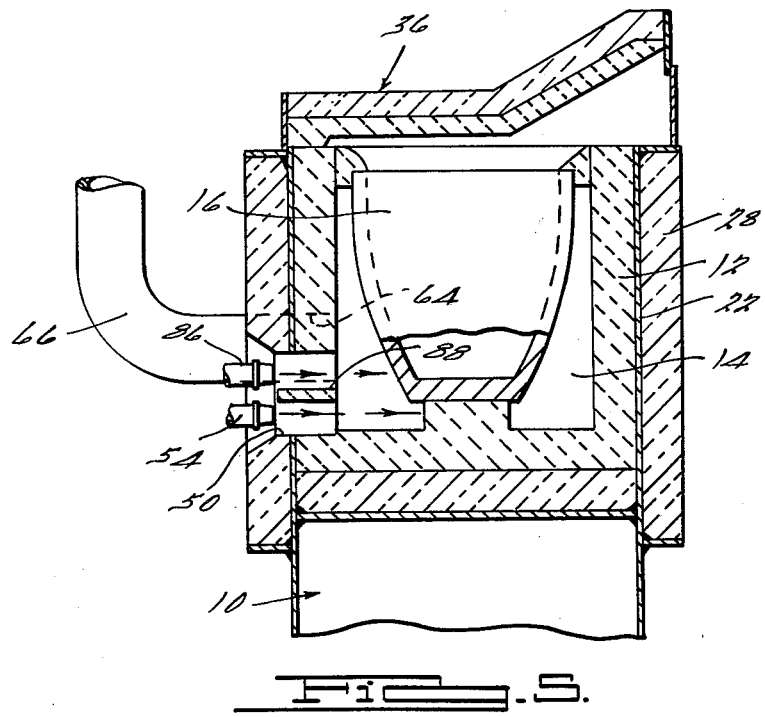
FIG. 5 is a figure similar to FIG. 1 illustrating a third embodiment of the present invention.

In FIG. 5 is illustrated a third embodiment of the invention. This embodiment also concerns a four burner furnace having a greater heating capacity than the furnace of the first embodiment, however, in this embodiment the second pair of burners, one of which is indicated at 86, is positioned in a common horizontal plane slightly above the plane of burners 52 and 54. Serving burners 86 is a similar pair of flame ports 88. In this embodiment the two pairs of burners and flame ports are located as close as possible to the bottom of the combustion chamber, and the intermediately and symmetrically disposed pressure relief port 64 is positioned above the upper pair of burners to the same extent it was positioned above the only pair of burners in the first embodiment. The flow rates and flow distribution of this embodiment are the same as those in the first embodiment, the only difference being that in the present embodiment a greater amount of heat is available for absorption.

Figure 6:
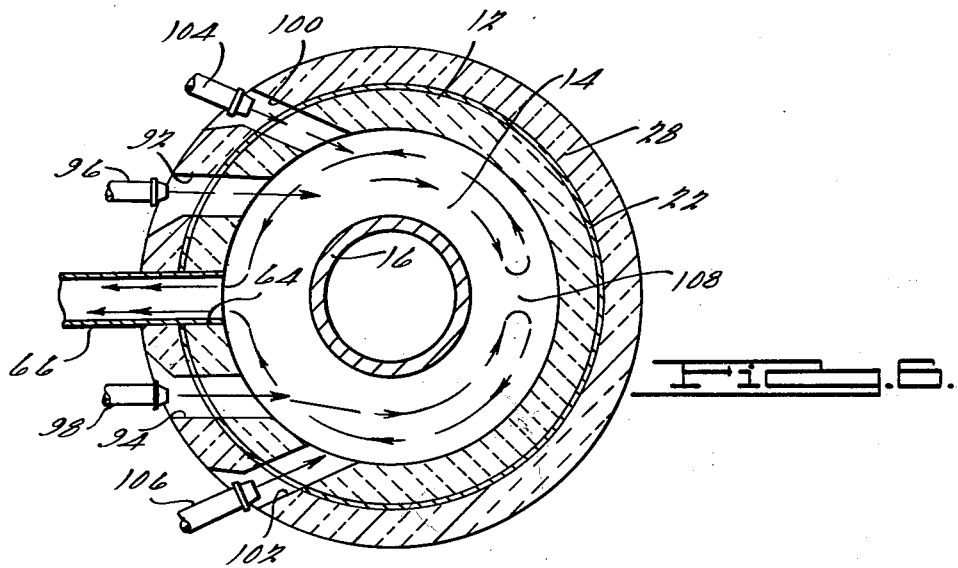
FIG. 6 is a figure similar to FIGS. 3 and 4 illustrating a fourth embodiment of the present invention.

A fourth embodiment of the present invention is illustrated in FIG. 6 in the form of another four-burner high heat capacity pot type furnace. In this embodiment there is provided a first pair of flame ports 92 and 94 through which act primary burners 96 and 98, respectively. While burners 96 and 98 are shown diverging somewhat, for present descriptive purposes they will be considered as being generally parallel, their precise angles being non-critical so long as the flames issuing therefrom do not directly converge and have path having a component of velocity parallel to the plane of symmetry. A second pair of flame ports 100 and 102 is provided in the same plane as ports 92 and 94, and have disposed therein a pair of booster burners 104 and 106. The horizontal plane of all four burners is the same and is positioned as close to the bottom of the combustion chamber 14 as is possible and just below the plane of the bottom of the crucible. Intermediate ports 92 and 94 is provided the pressure relief port 64 in which is positioned stack 66, these being positioned slightly above the plane of the burners, just as in the first embodiment. As will be appreciated, this embodiment operates in exactly the same manner as the first embodiment, with exactly the same flow distribution. The only difference is that greater heat capacities are available through the provision of the booster burners. The initial flow rates are set exactly the same as for the first embodiment, however, since the booster burners are positioned farther from the pressure relief port and closer to the zone 108 where the two flows meet, the gas and air flow rates therethrough may be slightly smaller than through primary burners 96 and 98. If desired, a third pair of burners may be provided for extra high heat applications, and in such a case may be located in the same plane as the four existing burners but further spaced around the circumference of the furnace. Such an application might also be desired where the pot is not a circular crucible but is instead an elongated configuration along the plane of symmetry, as can be readily visualized.

As will be appreciated, the present invention is readily embodied in many types of furnaces. For example, the two-burner arrangements are ideal for slow melting where time is not a critical factor or where the metal is preheated or as holding furnaces, such as those commonly used in conjunction with die-casting machines, which are supplied with molten material often taken from a separate large capacity reverberatory furnace. In such applications the molten material is held in the holding furnace adjacent the die-casting machine for convenient access, and for purifying the molten metal. The four, or more, burner arrangements are ideal for melting furnaces for both rapid melting and holding material for purification and use, thus avoiding the use of a reverberatory furnace with its attendant contamination of the molten material. The invention is also applicable to heating units, furnaces or ovens where a container other than a pot or crucible is used, such as for example an oven box or a heat exchanger. The latter application might be for heating buildings, the water or air passing through the heat exchanger wherein it is heated. However, in all applications the same basic criteria and principles will apply, with the resulting aforementioned economies.

The present invention contemplates the application of a number of criteria, including the following. The primary burners and flame ports are provided in pairs and are located symmetrically about a pressure relief port positioned slightly thereabove. In addition, they are located as close as possible to the bottom of the combustion chamber and just below the bottom of the container to be heated. The pressure relief port is preferably located on an axis of symmetry for more streamlined flow. The furnace operates with a stack on downdraft principles and utilizes a neutral pressure level which is preferably established as low as possible for maximum distribution of heat. Combustion chamber size and flue or stack size are based on industry standards for furnaces of the same type, however, it is preferable that the combustion chamber extend substantially 360° or all the way around the pot or article to be heated in a generally annular shape. The burners should be positioned so that the flames therefrom will not directly impinge upon the container heated, and where the latter is a crucible they should extend beneath the outward flared sides thereof just outside the base so that the convection currents will traverse the sides thereof. Preferably the heat currents from any one burner will not traverse the circumference of the combustion chamber a distance greater than approximately 180° from the burner.

While only crucibles of circular cross-section have been illustrated herein, for exemplary purposes, the principles of the present invention are fully applicable to furnaces or ovens utilizing many different shaped containers. The term "containers" is meant in its generic sense to include anything to be heated, such as oven boxes, heat exchangers, and so on. In all cases, however, the heat currents will travel from the burners around the object to be heated, will meet and rise again at the opposite end of the furnace, and will return around the object to the pressure relief port.

Thus, there is disclosed in the above description and in the drawings several exemplary embodiments of the invention which fully and effectively accomplish the desires thereof. However, it will be apparent that variations in the details of construction may be indulged in without departing from the sphere of the invention herein described, or the scope of the appended claims.

I claim:

1. A furnace comprising: a housing having means including side walls defining a fully enclosed chamber; a container receivable in said chamber for holding that which is to be heated by the furnace, said container having side walls spaced from said housing side walls to define a generally annular combustion chamber therebetween; access means providing access from outside said housing to the interior of said container; a pair of spaced burners located at one end of said combustion chamber symmetrically with respect to a vertical plane passing through the center of said chamber for respectively directing a flame and the resultant hot combustion products generally horizontally across said chamber adjacent the lowermost ends of the side walls of said container, a substantial portion of the combustion products rising to the top of said combustion chamber along the portion of the side wall of said container remote from said burners; a pressure relief port having a horizontal dimension less than the distance between said burners extending from said combustion chamber at said one end thereof, said pressure relief port being located in close proximity to said burners and lying in said vertical plane; and a stack communicating with said pressure relief port for removing combustion products from said chamber by drawing them across the upper portions of said side walls of said container towards said one end of said combustion chamber and then downwardly between the side walls of said housing and the side walls of said container adjacent said one end of said combustion chamber into said relief port.

2. A furnace as claimed in claim 1, wherein the axis of said pressure relief port is positioned just slightly above the level of the axes of said burners.

3. A furnace comprising: a housing having means including side walls defining a fully enclosed chamber; a container receivable in said chamber for holding that which is to be heated by the furnace, said container having side walls spaced from said housing side walls to define a generally annular combustion chamber therebetween; access means providing access from outside said housing to the interior of said container; a first pair of spaced burners located at one end of said combustion chamber symmetrically with respect to a vertical plane passing through the center of said chamber for respectively directing a flame and the resultant hot combustion products generally horizontally in one direction across said chamber adjacent the lowermost ends of the side walls of said container; a second pair of spaced burners located at the opposite end of said combustion chamber symmetrically with respect to said vertical plane for respectively directing a flame and the resultant hot combustion products generally horizontally in the opposite direction across said chamber adjacent the lowermost ends of the side walls of said container, a substantial portion of the combustion products from each of said pairs of burners rising to the top of said combustion chamber along the portions of the side wall of said container intermediate said pairs of burners; a pressure relief port extending from said combustion chamber at each of said ends thereof, each of said pressure relief ports being located in close proximity to the burners at the same end of said chamber and lying in said vertical plane, and each of said pressure relief ports having a horizontal dimension less than the distance between the adjacent burners; and a stack communicating with each of said pressure relief ports for removing from said chamber the combustion products from the adjacent burners by drawing them across the upper portions of said side walls of said container and then downwardly between the side walls of said housing and the side walls of said container adjacent said relief port into said relief port.

4. A furnace comprising: a housing having means including side walls defining a fully enclosed chamber; a container receivable in said chamber for holding that which is to be heated by the furnace, said container having side walls spaced from said housing side walls to define a generally annular combustion chamber therebetween; access means providing access from outside said housing to the interior of said container; two pairs of spaced burners located at one end of said combustion chamber, each pair being positioned symmetrically with respect to a vertical plane passing through the center of said chamber for directing a flame and the resultant hot combustion products generally horizontally across said chamber adjacent the lowermost ends of the side walls of said container, the major portion of the combustion products rising to the top of said combustion chamber along the side walls of said container; a pressure relief port having a horizontal dimension less than the distance between the closest pair of burners extending from said combustion chamber at said one end thereof, said pressure relief port being located in close proximity to said burners and lying in said vertical plane; and a stack communicating with said pressure relief port for removing combustion products from said chamber by drawing them across the upper portions of said side walls of said container towards said one end of said combustion chamber and then downwardly between the side walls of said housing and the side walls of said container adjacent said one end of said combustion chamber into said relief port.

5. A furnace as claimed in claim 4, wherein said pairs of burners are located one above the other and the axis of said pressure relief port is positioned just slightly above the level of the axes of upper pair of said burners.

6. A furnace as claimed in claim 4, wherein said pairs of burners are located at substantially the same level, one pair of burners being positioned between the burners forming the other pair.

7. A furnace as claimed in claim 6, wherein said outer pair of burners are positioned to direct flames in a converging direction with respect to one another and said inner pair of burners are positioned to direct flames generally parallel to one another.

8. A furnace as claimed in claim 6, wherein one of said pairs of burners is disposed in a generally parallel relation and the other of said pairs of burners is disposed in a generally converging relation with the flow paths of said one pair of burners.

9. A furnace comprising: a housing, a container receivable in said housing and having a bottom and upwardly extending side walls in spaced relationship with the interior of said housing to define a combustion chamber with said housing, uppermost portions of said side walls terminated by a periphery defining an open top, sealing means extending between said periphery and said housing for isolating said open top from said combustion chamber, a number of spaced flame ports located symmetrically with respect to a center axis of said container at one end of said chamber and extending thereinto in a common horizontal plane adjacent the bottom wall of said container, a burner nozzle positioned in each of said flame ports for directing a flame horizontally across the chamber adjacent the lowermost side edges of said container, a pressure relief port extending from said chamber at said one end thereof, said pressure relief port being located in close proximity to and on a vertical line intermediate said burners, and a stack communicating with said pressure relief port for removing combustion products from said chamber.

10. A furnace comprising: a housing, a container for holding a material to be heated receivable in said housing, said container having a bottom and upwardly extending side walls in spaced relationship with the interior of said housing to thereby define a chamber with said housing, uppermost portions of said side walls defining an open top, sealing means extending between said portions and said housing for isolating said open top from said chamber, a number of spaced flame ports located symmetrically with respect to a center axis of said container at one end of said chamber and extending thereinto in a common horizontal plane adjacent the bottom wall of said container, a burner nozzle positioned in each of said flame ports for directing a flame horizontally across said chamber, said burners being so positioned that the bottom wall of said container is disposed immediately above and between the projected axes thereof to thereby allow for the flow of combustion products to the opposite side of said chamber, a pressure relief port extending from said chamber at said one end thereof, the axis of said pressure relief port being located slightly above and intermediate the axes of said burners, and a stack communicating with said pressure relief port for drawing combustion products which have risen to the top of the chamber along the portion of the side wall of the container remote from the burners downward from the top of said chamber along the portion of the side wall of said container in front of said port.

11. A furnace according to claim 9 wherein said isolating sealing means is an insulating member spanning the space between said upper portions of said side walls and the side walls of said housing.

12. A furnace comprising: a housing, a container having outwardly flared sides and a substantially flat bottom receivable in said housing, said bottom and sides being in spaced relationship with the interior of said housing to thereby define a chamber with said housing, uppermost portions of said sides defining an open top, sealing means extending between said portions and said housing for isolating said open top from said chamber, a pair of spaced flame ports located symmetrically with respect to a center axis of said container at one end of said chamber and extending thereinto in a common horizontal plane adjacent the bottom of said container, a burner nozzle positioned in each of said flame ports for directing a flame horizontally across the bottom of said chamber, the projected axis of each burner extending beneath one of said outwardly flared sides of said container, a pressure relief port extending from said chamber at said one end thereof, the axis of said pressure relief port being located intermediate said burners and in close proximity to a line drawn through the axes of said burners, and a stack communicating with said pressure relief port for drawing combustion products from the top of said chamber downward along the surface of the side wall facing said ports.

13. A furnace comprising: a housing, a container receivable in said housing having a bottom and upwardly extending side walls in spaced relationship with the interior of said housing to thereby define a chamber with said housing, said container being symmetrical about a vertical plane and uppermost portions of said side walls defining an open top, sealing means extending between said uppermost portions and said housing for isolating said open top from said chamber to thereby enclose the side and bottom walls of said container in spaced relation to the sides and bottom of said combustion chamber, a pair of spaced flame ports located symmetrically with respect to said vertical plane at one end of said chamber and extending thereinto in a common horizontal plane adjacent the bottom of said container, a burner nozzle positioned in each of said flame ports for directing a flame horizontally across said chamber on one side of said plane, a pressure relief port extending from said chamber at said one end thereof, the axis of said pressure relief port being located in said vertical plane and slightly above said horizontal plane, and a stack communicating with said pressure relief port for removing combustion products from said chamber, whereby said combustion products are drawn downward from the top of said chamber along the adjacent surface of said container.

14. A furnace comprising: an open top container for holding material to be heated, a housing defining a fully enclosed generally annular combustion chamber extending 360° around the side walls of said container, said container and chamber being substantially symmetrical about a vertical plane, said housing including an annular member extending horizontally inwardly to engagement with the open top of said container, a pair of spaced flame ports located symmetrically with respect to said vertical plane at one end of said chamber and extending thereinto in a common horizontal plane adjacent the bottom wall of said container, a burner nozzle positioned in each of said flame ports for directing combustion products horizontally across said chamber on each side of said plane, the major portion of said combustion products meeting on the opposite side of said container and rising to the top of the chamber, a pressure relief port extending from said chamber at said one end thereof, the axis of said pressure relief port being centered above the axes of said burners and in said vertical plane, and a stack communicating with said pressure relief port for drawing combustion products from the top of said chamber downward along the side of said container in front of said port.

15. A furnace comprising: an open top container having outwardly flared sides and a bottom for holding material to be heated, a housing including vertical walls defining a fully enclosed generally annular combustion chamber spaced from the sides and bottom of said container, said container and chamber being substantialy symmetrical about a vertical plane, an annular member extending horizontally outwardly from the open top of said container to sealing engagement with said housing, a pair of spaced flame ports located symmetrically with respect to said vertical plane at one end of said chamber and extending thereinto in a common horizontal plane adjacent the bottom of said container, a burner nozzle positioned in each of said flame ports for directing a flame horizontally across the bottom of said chamber on each side of said plane, the projected axis of each burner extending beneath one of said outwardly flared sides of said container, a pressure relief port opposite the bottom of said container and extending from said chamber at said one end thereof, said pressure relief port being centered with respect to said burners and lying in said vertical plane, and a stack communicating with said pressure relief port for drawing combustion products from the top of said chamber.

16. A furnace comprising: a housing, a container for holding a material to be heated receivable in said housing, said container having a bottom and upwardly extending side walls in spaced relationship with the interior of said housing to thereby define a combustion chamber with said housing, uppermost portions of said side walls terminated by a periphery defining an open top, sealing means extending between said periphery and said housing for isolating said open top from said combustion chamber, a pair of spaced flame ports located symmetrically with respect to a center axis of said container at one end of said chamber and extending thereinto in a common horizontal plane extending between the bottom of said container and the bottom of said combustion chamber, the distance between said container and the bottom of said chamber being less than the diameter of said flame ports, a burner nozzle positioned in each of said flame ports for directing a flame horizontally across the bottom of said chamber, said burners being so positioned that the bottom of said container is disposed between the projected axes thereof, a pressure relief port extending from said chamber at said one end thereof, said pressure relief port being located in a position to draw combustion products downward from the top of said chamber, and a stack communicating with said pressure relief port for removing combustion products from said chamber.

17. A furnace comprising: a housing, a container for holding a material to be heated receivable in said housing, said container being symmetrical about a vertical plane and having a bottom and upwardly extending side walls in spaced relationship with the interior of said housing to thereby define a combustion chamber with said housing, a pair of spaced flame ports located symmetricaly with respect to said vertical plane at one end of said chamber and extending thereinto in a common horizontal plane adjacent the bottom of said container, a burner nozzle positioned in each of said flame ports for directing a flame horizontally across said chamber, each of said burners being adapted to operate so that the flame and hot combustion products therefrom will extend less than 180° around said container, a pressure relief port extending from said chamber at said one end thereof, the axis of said pressure relief port being located slightly above said horizontal plane of the axes of said burners and in said vertical plane, and a stack communicating with said pressure relief port for removing combustion products from said chamber.

References Cited by the Examiner

UNITED STATES PATENTS

| | | | |
|---|---|---|---|
| 865,789 | 9/07 | Martin | 263—14 |
| 901,956 | 10/08 | Creighton | 263—42 |
| 1,509,277 | 9/24 | Werra | 263—14 |
| 1,515,021 | 11/24 | Ferngren | 263—41 |
| 2,024,707 | 12/35 | South et al. | 263—14 |
| 2,450,087 | 9/48 | Hays | 263—43 |

CHARLES SUKALO, *Primary Examiner.*

JOHN J. CAMBY, *Examiner.*